United States Patent
Nammi et al.

(10) Patent No.: US 9,591,477 B2
(45) Date of Patent: Mar. 7, 2017

(54) HANDLING OF STREAM RESTRICTION IN A CELLULAR COMMUNICATIONS SYSTEM SUPPORTING FOUR BRANCH MIMO

(71) Applicant: Telefonaktiebolaget L M Ericsson (publ), Stockholm (SE)

(72) Inventors: Sairamesh Nammi, Kista (SE); Namir Lidian, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/433,352

(22) PCT Filed: Oct. 4, 2013

(86) PCT No.: PCT/SE2013/051165
§ 371 (c)(1),
(2) Date: Apr. 2, 2015

(87) PCT Pub. No.: WO2014/058378
PCT Pub. Date: Apr. 17, 2014

(65) Prior Publication Data
US 2015/0264560 A1    Sep. 17, 2015

Related U.S. Application Data

(60) Provisional application No. 61/710,897, filed on Oct. 8, 2012.

(51) Int. Cl.
*H04B 7/04*    (2006.01)
*H04W 8/24*    (2009.01)
(Continued)

(52) U.S. Cl.
CPC ............ *H04W 8/24* (2013.01); *H04B 7/0413* (2013.01); *H04B 7/0417* (2013.01);
(Continued)

(58) Field of Classification Search
CPC .. H04B 7/0417; H04B 7/0632; H04B 7/0689; H04B 7/024; H04W 8/24;
(Continued)

(56) References Cited

U.S. PATENT DOCUMENTS

2007/0030828 A1* 2/2007 Vimpari ............ H04W 72/1284
370/335
2010/0322333 A1* 12/2010 Goransson ............ H04L 1/0027
375/260
(Continued)

FOREIGN PATENT DOCUMENTS

SE   WO 2012/039659    *  3/2012   ............... H04B 7/06

OTHER PUBLICATIONS

3GPP TS 25.214 V11.3.0 Technical Specification; 3rd Generation Partnership Project; Technical Specification Group Radio Access Network; Physical layer procedures (FDD) (Release 11), (Sep. 2012), 112 pages.*

(Continued)

*Primary Examiner* — Edan Orgad
*Assistant Examiner* — Ivan O Latorre
(74) *Attorney, Agent, or Firm* — Patent Portfolio Builders, PLLC

(57) ABSTRACT

Methods, user equipment and controlling node for handling of stream restriction of the user equipment in a cellular communications system supporting four branch Multiple Input Multiple Output (MIMO) are disclosed. The user equipment supports one or more MIMO modes associated with four branch MIMO and one or more of a single stream restriction, a dual stream restriction and no restriction. The controlling node controls a base station. The user equipment signals at least one of said supported MIMO modes to the controlling node that determines one of said at least one MIMO modes to be used by the user equipment. The (Continued)

controlling node sends, to the user equipment, a mode instruction instructing the user equipment to use the determined MIMO mode.

24 Claims, 3 Drawing Sheets

(51) Int. Cl.
  *H04B 7/06* (2006.01)
  *H04W 72/04* (2009.01)
  *H04W 28/18* (2009.01)

(52) U.S. Cl.
  CPC ......... *H04B 7/0632* (2013.01); *H04B 7/0689* (2013.01); *H04W 72/046* (2013.01); *H04W 72/048* (2013.01); *H04W 72/0413* (2013.01); *H04W 28/18* (2013.01)

(58) Field of Classification Search
  CPC ........... H04W 72/048; H04W 72/0413; H04W 72/046; H04W 88/02; H04W 88/08; H04W 88/12; H04W 56/0045; H04W 24/10; H04L 1/1893; H04L 1/1887
  USPC .............. 370/329, 311, 336, 328, 338, 252; 375/267, 259, 260, 219
  See application file for complete search history.

(56) References Cited

U.S. PATENT DOCUMENTS

| | | | | |
|---|---|---|---|---|
| 2011/0085511 | A1* | 4/2011 | Fan | H04L 1/0031 370/329 |
| 2011/0116563 | A1* | 5/2011 | Vitthaladevuni | H04L 1/0001 375/260 |
| 2011/0249656 | A1* | 10/2011 | Cai | H04L 1/0028 370/336 |
| 2012/0177089 | A1* | 7/2012 | Pelletier | H04B 7/0417 375/219 |
| 2012/0287965 | A1* | 11/2012 | Sambhwani | H04B 7/0413 375/141 |
| 2013/0102342 | A1* | 4/2013 | Tesanovic | H04B 7/0623 455/507 |
| 2013/0114577 | A1* | 5/2013 | Cai | H04L 5/0053 370/336 |
| 2013/0195008 | A1* | 8/2013 | Pelletier | H04B 7/0417 370/328 |
| 2013/0242827 | A1* | 9/2013 | Lampinen | H04L 5/0092 370/311 |
| 2013/0308553 | A1* | 11/2013 | Cozzo | H04L 1/0027 370/329 |
| 2013/0329663 | A1* | 12/2013 | Pelletier | H04W 72/0413 370/329 |

OTHER PUBLICATIONS

Office Action in EP application No. 13845988.8 mailed Oct. 19, 2015.
"Introduction of 4Tx HSDPA in 25.331," 3GPP TSG-RAN WG2 Meeting #79, R2-123744, XP050665443, Aug. 13-17, 2012, pp. 253.
Nokia Siemens Networks "Feedback channel design for 4-Tx MIMO for HSDPA," 3GPP TSG RAN WG1 Meeting #67, R1-114144, XP050562113, Nov. 14-18, 2011, pp. 1-3.
PCT International Search Report for Counterpart International Application No. PCT/SE2013/051165, (Mar. 12, 2014), 4 pages.
PCT Written Opinion of the International Searching Authority for Counterpart International Application No. PCT/SE2013/051165, (Mar. 12, 2014), 12 pages.
3GPP TS 25.214 V11.3.0: "Physical layer procedures (FDD)", *3rd Generation Partnership Project; Technical Specification Group Radio Access Network; (Release 11)*, (Sep. 19, 2012), 112 pages.
3GPP TS 25.214 V7.10.0: "Physical layer procedures (FDD)", *3rd Generation Partnership Project; Technical Specification Group Radio Access Network (Release 7)*, (Dec. 18, 2008), 87 pages.
3GPP TS 25.306 V10.1.0: "UE Radio Access capabilities", *3rd Generation Partnership Project; Technical Specification Group Radio Access Network*, (Dec. 21, 2010), 60 pages.
3GPP TS 25.306 V11.3.0: "UE Radio Access capabilities", *3rd Generation Partnership Project, Technical Specification Group Radio Access Network (Release 11)*, (Sep. 24, 2012), 66 pages.
3GPP TS 25.331 V11.3.0: "Radio Resource Control (RRC); Protocol specification", *3rd Generation Partnership Project; Technical Specification Group Radio Access Network (Release 11); ETSI TS 125 331 V11.3.0 Universal Mobile Telecommunications System (UMTS)*, (Sep. 26, 2012), 1998 pages.
3GPP TS 25.331 V7.18.0: "Radio Resource Control (RRC); Protocol specification", *Universal Mobile Telecommunications System (UMTS); ETSI TS 125 331 V7.18.0*, (Oct. 8, 2010), 1493 pages.
R1-111763: "4-branch MIMO for HSDPA", *3GPP TSG RAN WG1 Meeting #65; Agenda Item: 5.6; Ericsson*, (May 9-13, 2011), 17 pages.
R1-123766: "Introduction of 4Tx_HSDPA", *TSG-RAN1 Meeting #70; Ericsson*, (Aug. 5, 2012), 13 pages.
R2-124802: "Dual-stream restriction for 4-branch MIMO", *3GPP TSG RAN WG2 #79bis; Agenda item: 10.3.1; Huawei, HiSilicon*, (Oct. 8-12, 2012), 2 pages.
Peisa, et al., "High Speed Packet Access Evolution—Concept and Technologies", *Vehicular Technology Conference*, VTC2007-Spring, IEEE 65th, (Apr. 22-25, 2007), pp. 819-824.

\* cited by examiner

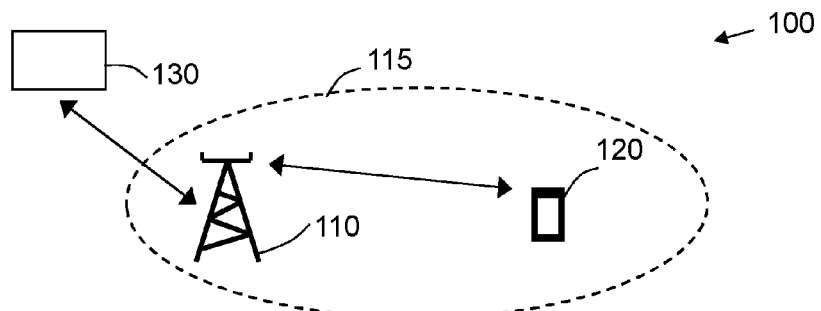
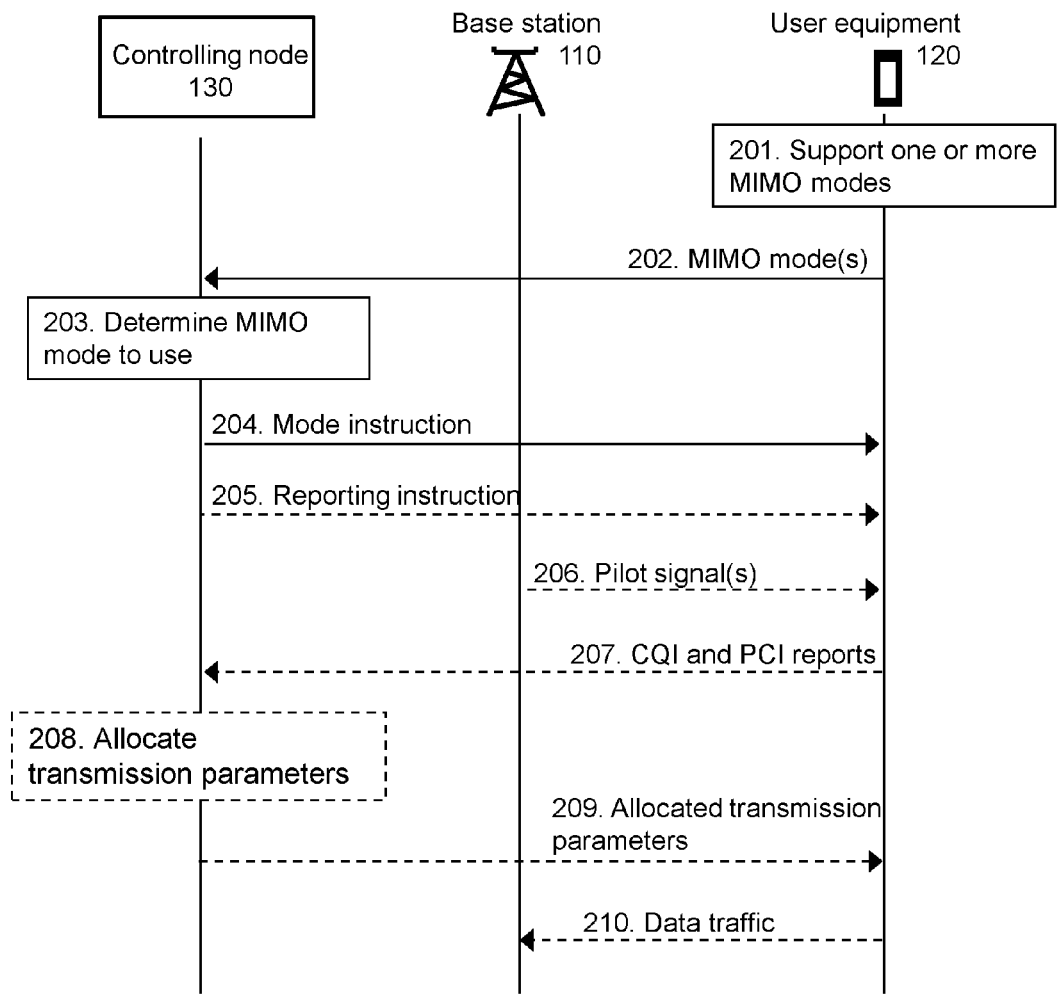
Fig. 2

HANDLING OF STREAM RESTRICTION IN A CELLULAR COMMUNICATIONS SYSTEM SUPPORTING FOUR BRANCH MIMO

CROSS-REFERENCE TO RELATED APPLICATIONS

This application is a National stage of International Application No. PCT/SE2013/051165, filed Oct. 4, 2013, which claims priority to U.S. Application No. 61/710,897, filed Oct. 8, 2012, which are hereby incorporated by reference.

TECHNICAL FIELD

Embodiments herein relate to a method and a user equipment for handling of stream restriction in a cellular communications system supporting four branch Multiple Input Multiple Output (MIMO) and to a method and a controlling node for handling of stream restriction of the user equipment.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, or radio communications system, sometimes also referred to as a cellular radio system, cellular network or cellular communications system. The communication may be performed e.g. between two wireless devices, between a wireless device and a regular telephone and/or between a wireless device and a server via a Radio Access Network (RAN) and possibly one or more core networks, comprised within the cellular communications network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Several new features are added for the long term HSPA evolution in order to meet the requirements set by the International Mobile Telecommunications Advanced (IMT-A). The main objective of these new features is to increase the average spectral efficiency. One possible technique for improving downlink spectral efficiency would be to introduce support for four branch Multiple Input Multiple Output (MIMO), i.e. utilize up to four transmit and receive antennas to enhance the spatial multiplexing gains and to offer improved beamforming capabilities. Four branch MIMO provides up to 84 Mbps per 5 MHz carrier for high signal to noise ratio (SNR) users and improves the coverage for low SNR users.

However, with introduction of four branch MIMO and support thereof in a cellular communications network, complexity increases and have to be handled.

SUMMARY

An object is to provide improvements with regard to support of four branch MIMO in a cellular communications system.

According to a first aspect of embodiments herein, the object is achieved by a method in a user equipment for handling of stream restriction in a cellular communications system supporting four branch MIMO. The cellular communications system comprises a base station serving a cell of the cellular communications system, and a controlling node controlling the base station. The user equipment supports one or more MIMO modes, which one or more MIMO modes are associated with four branch MIMO and one or more of a single stream restriction, a dual stream restriction and no restriction. The user equipment signals at least one of said supported MIMO modes to the controlling node via the base station. The user equipment then receives from the controlling node via the base station, in response to said signaling, a mode instruction instructing the user equipment to use one of said at least one MIMO mode signaled to the controlling node.

According to a second aspect of embodiments herein, the object is achieved by a method in a controlling node for handling of stream restriction of a user equipment in a cellular communications system supporting four branch MIMO. The cellular communications system comprises a base station serving a cell of the cellular communications system and that is controlled by the controlling node. The controlling node receives from the user equipment via the base station signaling of at least one MIMO mode supported by the user equipment. The at least one MIMO mode is associated with four branch MIMO and one or more of a single stream restriction, a dual stream restriction and no restriction. The controlling node determines, based on said received signaling, one of said at least one MIMO modes to be used by the user equipment. Moreover, the controlling node sends to the user equipment via the base station, a mode instruction instructing the user equipment to use the determined MIMO mode.

According to a third aspect of embodiments herein, the object is achieved by a user equipment for handling of stream restriction in a cellular communications system supporting four branch MIMO. The cellular communications system comprises a base station serving a cell of the cellular communications system, and a controlling node controlling the base station. The user equipment comprises a supporting circuitry configured to support one or more MIMO modes, which one or more MIMO modes are associated with four branch MIMO and one or more of a single stream restriction, a dual stream restriction and no restriction. The user equipment further comprises a signaling port configured to signal at least one of said supported MIMO modes to the controlling node via the base station. Furthermore, the user equipment comprises a receiving port configured to receive from the controlling node via the base station, in response to said signaling, a mode instruction instructing the user equipment to use one of said at least one MIMO mode signaled to the controlling node.

According to a fourth aspect of embodiments herein, the object is achieved by a controlling node for handling of stream restriction of a user equipment in a cellular communications system supporting four branch MIMO. The cellular communications system comprises a base station serving a cell of the cellular communications system and that is controlled by the controlling node. The controlling node comprises a receiving port configured to receive from the user equipment via the base station, signaling of at least one MIMO mode supported by the user equipment, which at least one MIMO mode is associated with four branch MIMO and one or more of a single stream restriction, a dual stream restriction and no restriction. The controlling node also comprises a determining circuitry configured to determine, based on said received signaling, one of said at least one MIMO mode to be used by the user equipment. Moreover, the controlling node comprises a sending port configured to send to the user equipment via the base station, a mode instruction instructing the user equipment to use the determined MIMO mode.

Embodiments herein enable use of legacy user equipments also for four branch MIMO, with minimal, or at least less, changes in software and/or hardware than else would be required. Embodiments herein also enable reduction of transmitted power when the user equipment uses single stream restriction that it has signaled via the one or more MIMO modes that it supports.

BRIEF DESCRIPTION OF THE DRAWINGS

Examples of embodiments herein are described in more detail with reference to the appended schematic drawings.

FIG. 1 is a schematic block diagram depicting an example of a cellular communications system, in relation to which embodiments herein will be explained.

FIG. 2 is a combined signalling diagram and flow chart for illustrating embodiments herein.

DETAILED DESCRIPTION

Figure 3:
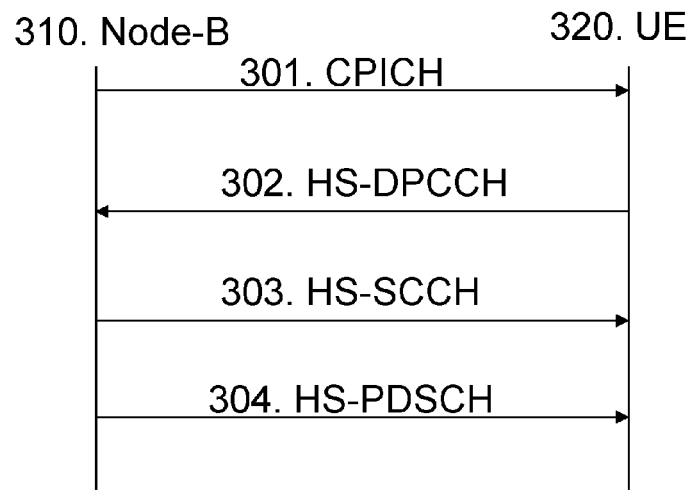
FIG. 3 schematically illustrates exchange of information during a typical data call set up.

Before presenting embodiments herein and as part of the development towards embodiments herein, the situation and problem indicated in the Background will be further discussed.

With the introduction of 4-branch MIMO, a number of new UE categories, see e.g. 3GPP Technical Specification (TS) 25.306, version 10.1.0, "UE Radio Access capabilities", Table 5.1a, need to be introduced. UE categories are used to indicate what features are supported by a certain UE type. For example, hitherto there are categories indicating the support of MIMO (2-branch), different multi carrier options, e.g. 2, 4, 6 or 8 carrier support, and highest modulation order supported by the UE, e.g. Quadrature Phase Shift Keying (QPSK), 16-Quadrature Amplitude Modulation (16QAM) or 64QAM. The number of categories is increasing rapidly when new functionality is added to the specification. This is due to the many combinations possible based on the above features.

In addition to UE categories, there are also capabilities defined, see e.g. 3GPP TS 25.306, version 10.1.0, "UE Radio Access capabilities", Section 4.5.3. For example, from Release 9 (Rel-9) the UE may indicate that it is able to receive a 2-branch MIMO transmission with single stream restriction. That is, the UE is capable of understanding MIMO signaling, but may only receive single stream transmissions. This capability may be signaled by any UE category not supporting MIMO, see e.g. 3GPP TS 25.306, version 10.1.0, "UE Radio Access capabilities", Section 5.1.

For Release 7 MIMO (2-branch MIMO), as e.g. defined in TS 25.214, version 7.10.0, the UE may be in any of the following configurations, as set up by the base station or by the network:

A. Non-MIMO mode. For example as in Release 5, as defined in 25.214, version 7.10.0, where the Node B is non-MIMO and supports only a single stream.

B. MIMO mode with 2 transmit antennas in the base station. For example as in Release 7 where the number of stream supported may be either equal to 1 or 2.

C. MIMO mode with 2 transmits antennas, where the number of streams supported is equal to 1, i.e. MIMO mode with single stream restriction.

For four branch MIMO mode, the UE may be in any of the following modes, as set up by the base station or by the network:

A. Non-MIMO mode. Same as that of Release 5 non-MIMO, see above.

B. MIMO mode. Same as that of Release 7 MIMO, see above.

C. MIMO mode with four transmit antennas, where the UE supports MIMO with four transmit antennas.

When 4-branch MIMO is introduced and/or defined for HSDPA, new UE categories may be needed to be introduced for signaling to the network that the UE supports this new functionality and/or capability, i.e. 4-branch MIMO. Since supporting up to 4 layers, or data streams, is very complex, especially when 4-branch MIMO is combined with multi-carrier operation, it is desirable to reduce the complexity needed in the terminal. For example, there may be UE categories that only support a lower number of data streams, e.g. 3 or 2 or 1.

With dual or single stream restriction, the UE category may signal if the UE supports 4-branch transmission to the network. To support data transmissions to the UEs that support 4-branch transmission, the network may have two options, which will be discussed below and in context of embodiments herein.

In brief, for four branch MIMO, there may be introduced dual and single stream restrictions. For example, 2-branch MIMO capable UEs or non-MIMO capable UEs, which are capable of receiving four branch MIMO, may indicate to the network their capability of receiving four branch MIMO, but with single stream or dual stream restriction.

With the introduction of dual stream and single stream restriction, many UEs may support four branch MIMO. In Release 7 MIMO mentioned above, with single stream restriction, a new DL MIMO mode is introduced to support single stream restriction. According to Release 7 MIMO, whenever a UE indicates that it is a MIMO single stream capable UE, the network assigns that UE to be in MIMO mode with single stream restriction. As will be shown below, with dual stream and single stream restriction in a four branch MIMO mode, introduction of further new MIMO modes may be avoided.

FIG. 1 is a schematic block diagram depicting an example of a cellular communications system 100, in relation to which embodiments herein will be explained. The cellular communications system 100 may be as described above and supports four branch MIMO. The cellular communications system 100 comprises a base station 110 serving a cell 115 of the cellular communications system 100. The term "base station" may denote a generic controlling node of a cell in the cellular communications system 100. As mentioned above, when the cellular communications system 100 is a HSPA based system, the base stations, including the base station 110 are typically named NodeBs. When the cellular communications system 100 is an LTE based system, the base stations, including the base station 110, are typically named eNBs. A user equipment 120 is comprised in, e.g. located in, the cell 115 and may thus be served by the base station 110 in the cell 115. Although not shown here, typically one or more additional user equipments are also present in the cell 115 and may be served at the same time by the base station 110. The cellular communications system 100 further comprises a controlling node 130 controlling the base station 110, i.e. the base station 110 is controlled by the controlling node 130. Hence, also the cell 115 may, via the base station 110, be considered controlled by the controlling node 130. When the cellular communications system 100 is HSPA based, the controlling node 130 may correspond to an RNC. In LTE based systems the eNB comprises corresponding functionality that in HSPA based systems are in the RNC and NodeB. Hence, the controlling node 130 and the base station 110 may in some embodiments be one and the same node.

Attention is again drawn to that FIG. 1 is only schematic and for exemplifying purpose. The cellular communications system 100 may, and typically will, in reality comprise several further cells, base stations, user equipments, network nodes etc., as realized by the skilled person, but which are not shown herein for simplicity. For example, in practise the cellular communications system 100 typically comprises further base stations that together with the base station 110 may be part of a radio access network of the cellular communications system 100, in which the base stations may be interconnected with each other and/or controlling nodes thereof. The base stations including the base station 110 may, directly or via controlling nodes, typically also be connected to a core network of the cellular communications system 100, which core network contains management and control functionality, subscription functionality, etc. and e.g. provides access to Internet services.

Examples of embodiments herein relating to a method in, e.g. performed by, the user equipment 120 for handling of stream restriction in the cellular communications system 100 and relating to a method in, e.g. performed by, the controlling node 130 for handling of stream restriction of the user equipment 110 in the cellular communications system 100, will now be described with reference to the combined signaling diagram and flowchart depicted in FIG. 2.

The following actions may be taken in any suitable order.

Action 201

The user equipment 120 supports one or more MIMO modes, which one or more MIMO modes are associated with four branch MIMO and one or more of a single stream restriction, a dual stream restriction and no restriction.

In some embodiments, the single stream restriction, the dual stream restriction and the no restriction are instead associated with a respective separate MIMO mode. This may correspond to MIMO modes C', D', E' that will be further discussed below in relation to what is named "Option I".

In some embodiments, the one or more MIMO modes is a single MIMO mode associated with the single stream restriction, the dual stream restriction and the no restriction. This corresponds to a MIMO mode C" that will be further discussed below in relation to what is named "Option II".

Action 202

The user equipment 120 signals at least one of said supported MIMO modes to the controlling node 130 via the base station 110. Hence, the controlling node 130 receives, from the user equipment 120 via the base station 110, the signaling of the at least one MIMO mode supported by the user equipment 120. The received at least one MIMO mode is thus associated with four branch MIMO and one or more of a single stream restriction, a dual stream restriction and no restriction.

Said at least one MIMO mode signalled to the controlling node 130 may thus comprise the single stream restriction and/or the dual stream restriction.

The signaling of the at least one supported MIMO mode, e.g. C", C' or D' may be accomplished correspondingly as signaling of the modes A-C discussed above. The signaling may take part during cell setup via Radio Resource Control (RRC) signalling.

In some embodiments the signalling may further comprise separate signalling associated with the number of supported streams. For example, in case of the one or more MIMO modes being a single MIMO mode associated with the single stream restriction, the dual stream restriction and the no restriction, the separate signalling may be in the form of UE capability sent during a RRC connection request message as e.g. specified in TS 25.331, version 7.18.0.

Action 203

The controlling node 130 determines, in response to said received signaling, one of said at least one MIMO modes to be used by the user equipment 120. The determination may comprise identifying that a mode, and e.g. stream restriction, that the user equipment 120 has signaled it supports, also is supported by the cellular communications system 100 in general and/or by the base stations 110 and/or controlling node 130 in particular.

Action 204

The controlling node 130 sends to the user equipment 120 via the base station 110, a mode instruction instructing the user equipment 120 to use the determined MIMO mode.

The user equipment 120 receives from the controlling node 130, via the base station 110, in response to said signaling, a mode instruction instructing the user equipment 120 to use one of said at least one MIMO mode signaled to the controlling node 130.

The mode instruction may be in the form of one or more RRC configuration and/or re-configuration messages.

In some embodiments, said mode instruction further instructs, based on the signalling, about a number of supported streams to use. For example, if the user equipment 120 has signalled a MIMO mode supporting multiple stream restrictions, the mode instruction may instruct what number of supported streams to actually use. In case the user equipment 120 has signalled support of only one mode and stream restriction the user equipment 120 may need no explicit instruction about a number of supported streams to use.

Action 205

The controlling node 130 may send, to the user equipment 120 via the base station 110, a reporting instruction instructing the user equipment 120 how to report a Channel Quality Indicator (CQI), and/or a Physical Channel Indicator (PCI), via an uplink feedback channel. The reporting instruction is based on the MIMO mode determined in Action 203. Thus, the user equipment 120 may receive, from the controlling node 130 via the base station 130, the reporting instruction instructing the user equipment 120 how to report the CQI and PCI via the uplink feedback channel. Since the MIMO mode determined by the controlling node is based on the at least one MIMO mode signalled to the controlling node (130) and the reporting instruction is based on the determined MIMO mode, the received reporting instruction is thus also based on the at least one MIMO mode signalled to the controlling node 130.

The reporting instruction will be further discussed below under Action 207.

Action 206

The user equipment 120 may receive from the base station one or more pilot signals. The one or more pilot signals may be sent and received over a common pilot channel.

This action may fully or partly correspond to action 301 that will be discussed separately below in connection with FIG. 3.

Action 207

The user equipment 120 may send to the controlling node 130, via the base station 130 and the uplink feedback channel, CQI and/or PCI reports based on said reporting instruction. Hence, the controlling node 130 may receive, from the user equipment 120 via the base station 130 and the uplink feedback channel, the CQI and/or PCI reports based on said reporting instruction.

The CQIs and PCIs that are reported in the CQI and PCI reports are typically based on measurements made by the user equipment 120 on the received one or more pilot signals.

In some embodiments, the CQI and/or PCI reports are according a first type, e.g. a Type A, for reporting CQI and/or PCI corresponding to a preferred number of streams. And/or the CQI and/or PCI reports may be according to a second type, e.g a Type B, for reporting about a single stream CQIs. The sending of the CQI and/or PCI reports of the first and/or second type may be according to a ratio between the first and second type, which ratio is comprised in the reporting instruction and is based on the MIMO mode that the mode instruction instructed the user equipment 130 to use. The Type A and the Type B will be further described and exemplified separately below.

Moreover, in some embodiments, the mode instruction instructs the user equipment 130 to use a MIMO mode comprising single stream restriction, e.g. as described above. Said ratio comprised in the reporting instruction may then advantageously indicate reporting only according to the second type, or at least according to a maximal amount that is available according to values allocated for the ratio. Thanks to this the user equipment 120 is enabled to need lower power for reporting than else would be the case. These embodiments will be further discussed separately below. Reporting only according to the second type corresponds to the proposed method 1 discussed below and reporting at least according to a maximal amount that is available according to values allocated for the ratio corresponds to the proposed method 2 discussed below.

The CQI and/or PCI reports may be sent and received over a dedicated physical control channel.

This action may fully or partly correspond to action 302 that will be discussed separately below in connection with FIG. 3.

Action 208

The controlling node 10 may allocate transmission parameters based on the received CQI and/or PCI reports. The transmission parameters may e.g. comprise channelization codes, modulation and coding parameters and precoding channel index to the user equipment 120 after scheduling.

This action may fully or partly correspond to action 303 that will be discussed separately below in connection with FIG. 3.

Action 209

The controlling node 130 may send, to the user equipment 120 via the base station 110, the allocated transmission parameters. Thus, the user equipment 120 may receive, from the controlling node 130 via the base station, the allocated transmission parameters.

The allocated transmission parameters may be sent and received over a shared control channel.

This action may fully or partly also correspond to action 303 that will be discussed separately below in connection with FIG. 3.

Action 210

In response to and based on the received allocated transmission parameters, downlink data traffic may start. The downlink data traffic may take part over an physical downlink shared channel.

This action may fully or partly correspond to action 304 that will be discussed separately below in connection with FIG. 3.

Note that in FIG. 2, as explained above in connection with FIG. 1, the controlling node 130 and the base station 110 are in some embodiments one and the same node. For example, the controlling node 130 may be the base station 110 and all actions in FIG. 2 relating to the controlling node 130 may be performed by the base station 110.

The two options mentioned above under Action 201 will now be further discussed and exemplified.

Option I

In this example, two new additional MIMO modes are introduced, MIMO modes with four branch MIMO with dual stream restriction and with single stream restriction. Hence, the MIMO modes supported by this option are:

A'. Non-MIMO mode that may be the same as mode A of Release 5 non-MIMO mentioned above.

B'. MIMO mode that may be the same as mode B of Release 7 MIMO mentioned above.

C'. MIMO mode with four transmit antennas, where the UE supports MIMO with four transmit antennas.

D'. MIMO mode with four transmit antennas with dual stream restriction. where the UE support MIMO with four transmit antennas and with a number of streams supported that is either 1 or 2.

E'. MIMO mode with four transmit antennas with single stream restriction, where the UE, e.g. the user equipment 120, supports MIMO with four transmit antennas and with a number of streams supported that is 1.

Capability for A', B', C', D' or E' may be signaled from the UE, e.g. the user equipment 120, to the network during cell setup, via RRC signaling, and the network, e.g. the controlling node 130 and/or the base station 110, instructs the UE regarding the use of mode A', B', C', D' or E'.

Option II

This option supports dual stream and single stream restricted UEs as part of a MIMO mode with four transmits antennas in the base station. The modes with this option are:

A". Non-MIMO mode that may be the same as mode A of Release 5 non-MIMO mentioned above.

B". MIMO mode that may be the same as mode B of Release 7 MIMO mentioned above.

C". MIMO mode with four transmit antennas in the base station, where the UE supports MIMO with four transmit antennas with single stream restriction, dual stream restriction or no restrictions.

Capability for A", B" or C" may be signaled from the UE, e.g. the user equipment 120, to the network, e.g. the controlling node 130 and/or the base station 110, during cell setup, via RRC signaling, and the network instructs the UE regarding the use of mode A", B" or C".

As mentioned in the above, option I involves introduction of two new MIMO modes with stream restriction in addition to the three modes (A-C) according to previous standards. Introduction of these modes requires new design for control channels for example uplink feedback channel, downlink control channel. It may hence be beneficial if instead option II may be used. Option II requires no new MIMO modes to be introduced. Hence, the network is enabled to support stream restricted UEs without having to introduce and handle another MIMO mode with stream restriction compared to what may typically already be supported. This reduces signaling burden and reduces impact on already existing standards and cellular communications systems.

The network may further implement dual stream restriction and single stream restriction by configuring the uplink feedback channel reporting types as will be described below. However, first channel quality reporting will be briefly explained in the case of HSPA.

FIG. 3 schematically illustrates exchange of information during a typical data call set up between a Node-B 310, corresponding to the base station 110 in the case of the cellular communications system 100 being HSPA-based, and a UE 320 corresponding to the user equipment 120 in the case of the cellular communications system 100 being HSPA-based.

According to an action 301 the UE 320 based on what is named the Common Pilot CHannel (CPICH) may estimate the channel and compute channel quality information, e.g. CQI, and pre-coding channel indicator, e.g. PCI.

According to an action 302 this information may then along with hybrid Automatic Repeat request (ARQ) ACKnowledegment/Not AcKknowledgement (ACK/NAK) be reported to the Node-B 310 using what is named the High Speed Dedicated Physical Control CHannel (HS-DPCCH). The periodicity of HS-DPCCH is typically one subframe (2 msec).

According to an action 303, after the Node-B 310 receives information about reporting intervals between Type A and Type B reports, which will be further discussed below in connection with FIG. 4, it allocates required channelization codes, modulation and coding, precoding channel index to the UE 320 after scheduling, and conveys this to the UE 320 using what is named the High Speed Shared Control CHannel (HS-SCCH).

According to an action 304, also mentioned below in connection with FIG. 4, once the UE 310 detects the HS-SCCH, downlink transmission start using what is named the High Speed Physical Downlink Shared Channel (HS-PDSCH).

Figure 4:
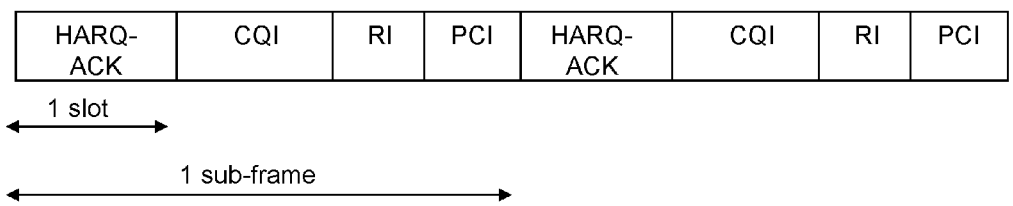
FIG. 4 schematically illustrates the typical structure of High Speed Dedicated Physical Control CHannel (HS-DPCCH) for a single carrier.

FIG. 4 schematically illustrates the typical structure of the HS-DPCCH for a single carrier. As known from the Release 7 MIMO, the HS-DPCCH sub-frame structure comprises 1 slot for HARQ-ACK transmissions and 2 slots for CQI/RI/PCI transmissions. The same structure may be used for a four branch MIMO system, such as for the cellular communications system 100. In addition, two different types, Type A and Type B, of CQI formats for four branch MIMO system are typically supported in the four branch MIMO system and may be reported over an uplink feedback channel, e.g. the HS-DPCCH. Reporting of the two types will now be described:

Type A

In a Type A report the UE 320 conveys information about the preferred number of streams, and CQI and PCI corresponding to that preferred number of streams. For Type A reporting the 8 information bits are used to describe the CQI information for both the codewords, 2 bits are used to convey the rank information and 4 bits are used to describe the PCI information. A resulting composite CQI/RI/PCI report according to Type A may be encoded by a convolutional code which is then rate-matched to output 40 encoded bits. The information may be spread with a spreading factor of 128.

Type B

In a Type B report, the UE conveys information about single stream CQIs. This type of CQIs may help a Node B scheduler whenever the UE 320 reports CQI information corresponding to Ranks 2, 3 or 4 CQI, but only single stream transmissions may be scheduled. In this case 5 bits may be used to describe CQI and 4 bits may be used to describe PCI for the single stream. Hence in total 9 input bits may be needed to convey more complete information about CQI and PCI. Next some design options to encode these 9 bits are outlined.

Similar as in the Release 7 MIMO, the network may set different reporting intervals between Type A and Type B reporting for four branch MIMO. Hence there may be switching between Type A and Type B reports. Note that RRC may signal the exact reporting periods for each type report. A parameter that may be named and defined according to N_cqi_typeA/M_cqi={1/2, 2/3, 3/4, 4/5, 5/6, 6/7, 7/8, 8/9, 9/10, 1/1} may be signalled via RRC from the RNC to the UE, see e.g. 3GPP TS 25.331, version 7.18.0, "Radio Resource Control (RRC)", Section 8.5.32. The parameter describes the ratio of CQI/PCI reports that are of Type A. Once the Node-B 310 receives this information, it allocates the required channelization codes, modulation and coding, precoding channel index to the UE 320 after scheduling and this information may be conveyed to UE 320 in the action 303 as described above using the HS-SCCH. As mentioned above, once the UE 310 detects the HS-SCCH, downlink transmission may start in the action 304 through data traffic channel using the HS-PDSCH.

In view of the above, the following two example methods, method 1 and method 2, are proposed for single stream restriction:

Method 1

For single stream restriction, Type B reporting suits well, as it reports only CQI corresponds to single stream. Hence it is ideal with 100% Type B reporting for single stream restriction. A solution to this may be to add additional value to N_cqi_typeA/M_cqi={1/2, 2/3, 3/4, 4/5, 5/6, 6/7, 7/8, 8/9, 9/10, 1/1}, e.g. so that it is formed a new N_cqi_typeA/M_cqi={0/1, 1/2, 2/3, 3/4, 4/5, 5/6, 6/7, 7/8, 8/9, 9/10, 1/1}. Hence, according to method 1, a proposal is N_cqi_typeA/M_cqi={0/1, 1/2, 2/3, 3/4, 4/5, 5/6, 6/7, 7/8, 8/9, 9/10, 1/1}.

Hence, whenever the network identifies, e.g. by means of an RRC set up message, a UE, e.g. the UE 310, with single stream restriction under e.g. Modes B" and C" as described under option II above, it may configure the UE 310, e.g. by means of sending the UE 320 an RRC configuration message of N_cqi_typeA/M_cqi=0/1, and hence all the reporting will be of Type B.

An advantage with method 1 is that the UE needs less power for reporting than else would be the case, as type B reports needs less power than Type A reports.

Method 2

In method 2, instead of adding another value for N_cqi_typeA/M_cqi, values already in the standard may be reused, but selected with a low value for the Type A/Type B ratio. Hence in the exemplifying case the ratio 1/2. may be used, which is according to a maximal amount that is available according to values allocated for the ratio.

Hence, whenever the network identifies a UE, e.g. the UE 310, for example by means of an RRC set up message, with single stream restriction under Modes B" and C" as described under option II above, the network may configure the UE, e.g. by means of sending the UE 310 an RRC configuration message N_cqi_typeA/M_cqi=1/2, hence 50% Type A and 50% Type B.

An advantage with method 2 is that it may not require any standard change as existing value of the Type A/Type B ratio may be used with e.g. 50% reporting is on Type B and hence it is still enabled some savings in power for reporting channel quality.

Figure 5:
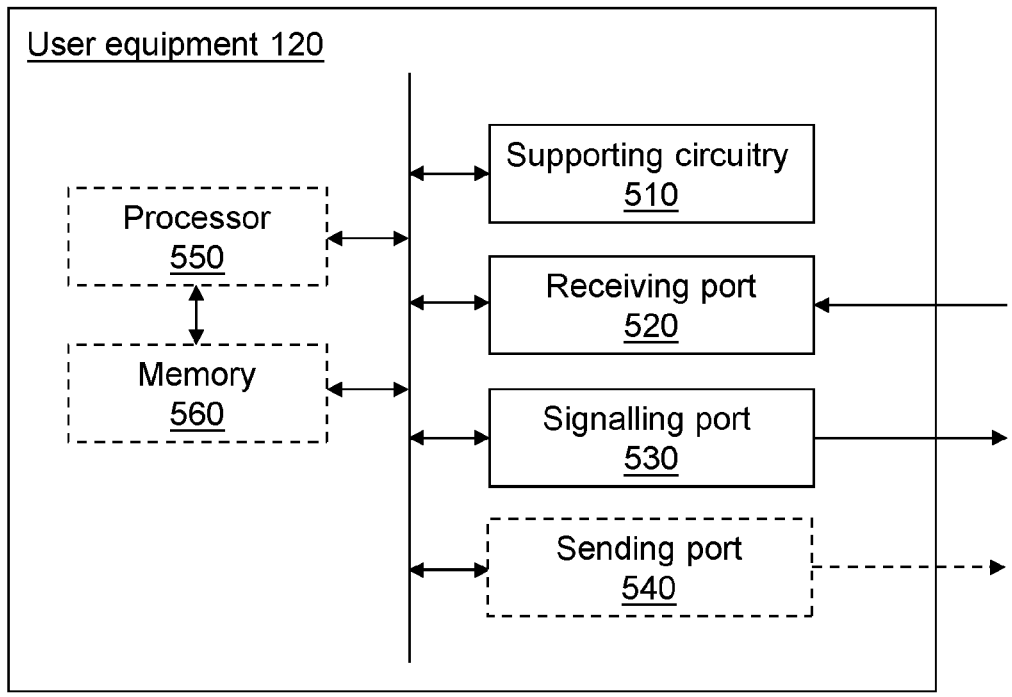
FIG. 5 is a schematic block diagram illustrating a user equipment according to embodiments herein.

To perform the actions 201-207 above with regard to a method in the user equipment 120 for handling of the stream restriction in the cellular communications system 100 supporting four branch MIMO, the user equipment 120 may comprise an arrangement schematically depicted in FIG. 5.

The user equipment 120 comprises a supporting circuitry 510 configured to support said one or more MIMO modes, which said one or more MIMO modes are associated with four branch MIMO and one or more of a single stream restriction, a dual stream restriction and no restriction.

The user equipment 120 further comprises a signaling port 520 configured to signal at least one of said supported MIMO modes to the controlling node 130 via the base station 110.

Furthermore, the user equipment 120 comprises a receiving port 530 configured to receive from the controlling node 130 via the base station 110, in response to said signaling, the mode instruction instructing the user equipment 120 to use one of said at least one MIMO mode signaled to the controlling node 130. In some embodiments, the receiving port 530 is further configured to receive from the controlling node 130 via the base station 130, the reporting instruction instructing the user equipment 120 how to report the CQI and/or PCI via the uplink feedback channel, where said reporting instruction is based on said at least one MIMO mode signalled to the controlling node 130.

In some embodiments the user equipment 120 further comprises a sending port 540 configured to send to the controlling node 130 via the base station 130 and the uplink feedback channel, the CQI and/or PCI reports based on said reporting instruction. As already mentioned, the CQI and/or PCI reports may be according to the first type, e.g. Type A, for reporting CQI and PCI corresponding to the preferred number of streams and/or according to the second type, e.g. Type B, for reporting about the single stream CQIs. The sending port 540 may be configured to send the reports of the first and/or second type according to the ratio between the first and second type, which ratio is comprised in the reporting instruction and is based on the MIMO mode that the mode instruction instructed the user equipment 130 to use.

The embodiments of the user equipment 120 may be fully or partly be implemented through one or more processors, such as a processor 550 depicted in FIG. 5, together with computer program code for performing the functions and actions of embodiments herein. In some embodiments the circuitry discussed above may be fully or partially implemented by the processor 550.

The computer program code mentioned above may also be provided as a computer program product, for instance in the form of a data carrier carrying computer program code for performing the embodiments herein when being loaded into the in the user equipment 120. One such carrier may be in the form of a CD or DVD. It is however feasible with other data carriers such as a memory stick, memory card or hard drive. The computer program code may furthermore be provided as pure program code on a server for download to the user equipment 120.

The computer program code may furthermore be provided in the form of a data file or files on, or available through, a server for download. The file or files may be executable files for direct or indirect download to and execution on the user equipment 120, or may be for intermediate download and compilation to make them executable before download to and for execution in the user equipment 120. The server may be accessible over a computer network, such as the Internet, and may e.g. be a web or ftp server.

The user equipment 120 may further comprise a memory 560 comprising one or more memory units. The memory 560 is arranged to store data, such as configurations and/or applications to perform the method when being executed in the user equipment 120.

Those skilled in the art will also appreciate that the circuitry 510-540 may refer to a combination of analog and digital circuits, and/or one or more processors configured with software and/or firmware (e.g., stored in memory) that, when executed by the one or more processors such as the processor 550, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 6:
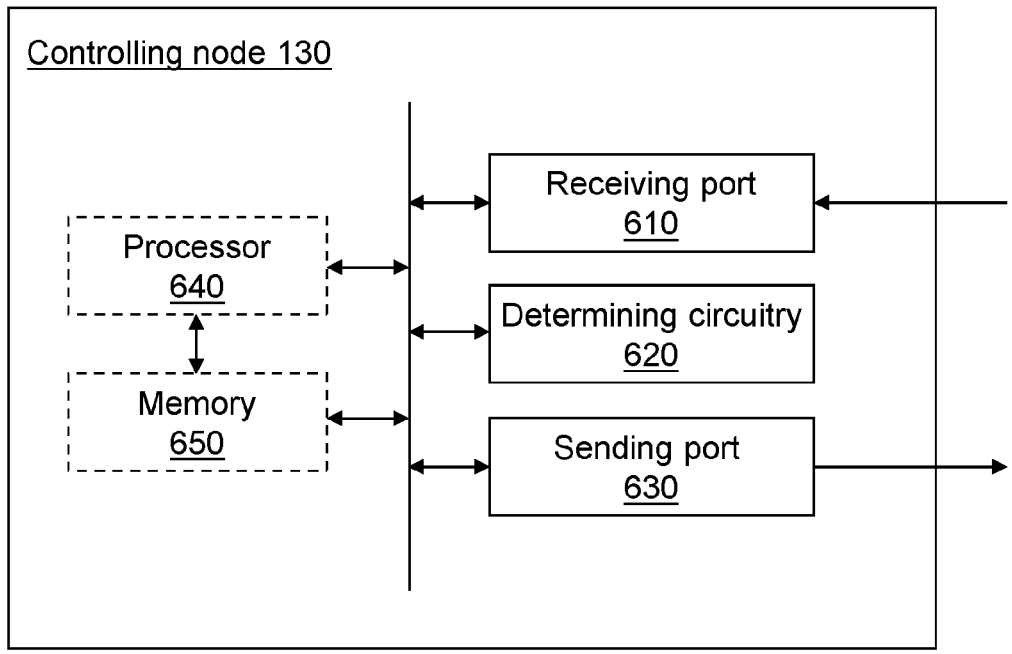
FIG. 6 is a schematic block diagram illustrating a controlling node according to embodiments herein.

To perform the actions 201-207 above with regard to a method in the controlling node 130 for handling of stream restriction of the user equipment 110 in the cellular communications system 100 supporting four branch MIMO, the controlling node 130 may comprise an arrangement schematically depicted in FIG. 6.

The controlling node 130 comprises a receiving port 610 configured to receive from the user equipment 120 via the base station 110, the signaling of at least one MIMO mode supported by the user equipment 120, which at least one MIMO mode is associated with four branch MIMO and one or more of a single stream restriction, a dual stream restriction and no restriction.

The controlling node 130 further comprises a determining circuitry 620 configured to determine, based on said received signaling, the above-mentioned one of said at least one MIMO mode to be used by the user equipment 120.

Moreover, the controlling node 130 comprise a sending port 630 configured to send to the user equipment 120 via the base station 110, the mode instruction instructing the user equipment 120 to use the determined MIMO mode.

In some embodiments the sending port 630 is further configured to send to the user equipment 120 via the base station 110, the reporting instruction instructing the user equipment 120 how to report the CQI and/or PCI via the uplink feedback channel, said reporting instruction being based on the determined MIMO mode. The receiving port may be further configured to receive from the user equipment 120 via the base station 130 and the uplink feedback channel, the CQI and PCI reports based on said reporting instruction.

The embodiments of the controlling node 130 may be fully or partly be implemented through one or more processors, such as a processor 640 depicted in FIG. 6, together with computer program code for performing the functions and actions of embodiments herein. In some embodiments the circuitry discussed above may be fully or partially implemented by the processor 640.

The computer program code mentioned above may also be provided as a computer program product, for instance in the form of a data carrier carrying computer program code for performing the embodiments herein when being loaded into the in the controlling node 130. One such carrier may be in the form of a CD or DVD. It is however feasible with other data carriers such as a memory stick, memory card or hard drive. The computer program code may furthermore be provided as pure program code on a server for download to the controlling node 130.

The computer program code may furthermore be provided in the form of a data file or files on, or available through, a server for download. The file or files may be executable files for direct or indirect download to and execution on the controlling node 130, or may be for intermediate download and compilation to make them executable before download to and for execution in the controlling node 130. The server may be accessible over a computer network, such as the Internet, and may e.g. be a web or ftp server.

The controlling node 130 may further comprise a memory 650 comprising one or more memory units. The memory 650 is arranged to store data, such as configurations and/or applications to perform the method when being executed in the controlling node 130.

Those skilled in the art will also appreciate that the circuitry 620-630 may refer to a combination of analog and digital circuits, and/or one or more processors configured with software and/or firmware (e.g., stored in memory) that, when executed by the one or more processors such as the processor 640, perform as described above. One or more of these processors, as well as the other digital hardware, may be included in a single ASIC, or several processors and various digital hardware may be distributed among several separate components, whether individually packaged or assembled into a SoC.

Embodiments herein enable reuse of legacy UEs for four branch MIMO with minimal, or at least less, changes in software/hardware than else would be required.

Embodiments herein, as e.g. explained regarding method 1 and method 2, also enable reduction of transmitted power when the user equipment is single stream restricted.

In the above description of embodiments herein, HSPA and LTE based system and terminology therefrom have been used as examples. Any terminology from any of these systems that have been used above is by way of example, and may be exchanged for corresponding terminology form the other system, or from other cellular systems in general. When the term "the network" has been used in isolation above it may refer to the controlling node 130 and/or the base station 110. For example, in embodiments where the cellular communications system 100 is HSPA based, "the network" typically refers to the RNC or a combination of the RNC and the NodeB, and when the cellular communications system 100 is LTE based, "the network" typically refers to the eNB. It should also be noted that although embodiments herein may have certain advantages associated with e.g. HSPA based systems and/or LTE based systems, embodiments herein may be applied in the context of also other technologies.

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a user equipment for handling of stream restriction in a cellular communications system supporting four branch Multiple Input Multiple Output (MIMO), the cellular communications system comprising a base station serving a cell of the cellular communications system, and a controlling node controlling the base station, wherein the method comprises:

supporting one or more MIMO modes of MIMO operation of the user equipment, which one or more MIMO modes are associated with four branch MIMO and one or more of a single stream restriction, a dual stream restriction and no restriction, wherein the one or more MIMO modes comprise a MIMO mode, which is a single MIMO mode associated with the single stream restriction, the dual stream restriction, and the no restriction, signaling of at least one of said supported MIMO modes to the controlling node via the base station, wherein when the MIMO mode, which is the single MIMO mode associated with the single stream restriction, the dual stream restriction, and the no restriction, is signaled, the signaling further comprises separate signaling associated with number of supported streams, and receiving, from the controlling node via the base station, in response to said signaling, a mode instruction instructing the user equipment to use one of said at least one MIMO modes signaled to the controlling node.

2. The method as claimed in claim 1, wherein the one or more MIMO modes further comprise separate MIMO modes, each associated with the respective single stream restriction, dual stream restriction and no restriction.

3. The method as claimed in claim 1, wherein said at least one MIMO mode signaled to the controlling node comprises the single stream restriction and/or the dual stream restriction.

4. The method as claimed in claim 1, wherein the method further comprises:
receiving from the controlling node via the base station, a reporting instruction instructing the user equipment how to report a Channel Quality Indicator (CQI), and/or Physical Channel Indicator (PCI), via an uplink feedback channel, said reporting instruction being based on said at least one MIMO mode signaled to the controlling node, and
sending to the controlling node via the base station and the uplink feedback channel, CQI and/or PCI reports based on said reporting instruction.

5. The method as claimed in claim 4, wherein the CQI and/or PCI reports are according to a first type for reporting CQI and PCI corresponding to a preferred number of streams and/or a second type for reporting about a single stream CQIs, and wherein the sending of the reports of the first and/or second type is according to a ratio between the first and second type, which ratio is comprised in the reporting instruction and is based on a MIMO mode that the mode instruction instructed the user equipment to use.

6. The method as claimed in claim 5, wherein the mode instruction instructs the user equipment to use a MIMO mode comprising single stream restriction and the ratio comprised in the reporting instruction indicates reporting only according to the second type, or at least according to a maximal amount that is available according to values allocated for the ratio.

7. A method in a controlling node for handling of stream restriction of a user equipment in a cellular communications system supporting four branch Multiple Input Multiple Output (MIMO), the cellular communications system comprising a base station serving a cell of the cellular communications system and being controlled by the controlling node, wherein the method comprises:
receiving, from the user equipment via the base station, signaling of at least one of one or more MIMO modes supported by the user equipment, which one or more MIMO modes are associated with four branch MIMO and one or more of a single stream restriction, a dual stream restriction and no restriction, wherein the one or more MIMO modes comprise a MIMO mode, which is a single MIMO mode associated with the single stream restriction, the dual stream restriction, and the no restriction, wherein when the MIMO mode, which is the single MIMO mode associated with the single stream restriction, the dual stream restriction, and the no restriction, is signaled, the signaling further comprises separate signaling associated with number of supported streams,
determining, based on said received signaling, one of said at least one MIMO modes to be used by the user equipment, and
sending, to the user equipment the base station, a mode instruction instructing the user equipment to use the determined MIMO mode.

8. The method as claimed in claim 7, wherein the one or more MIMO modes further comprise separate MIMO modes, each associated with the respective single stream restriction, dual stream restriction and no restriction.

9. The method as claimed in claim 7, wherein said at least one MIMO mode signaled to the controlling node comprises the single stream restriction and/or the dual stream restriction.

10. The method as claimed in claim 7, wherein the method further comprises:
sending, to the user equipment via the base station, a reporting instruction instructing the user equipment how to report a Channel Quality Indicator (CQI), and Physical Channel Indicator (PCI), via an uplink feedback channel, said reporting instruction being based on the determined MIMO mode, and
receiving, from the user equipment via the base station and the uplink feedback channel, CQI and PCI reports based on said reporting instruction.

11. The method as claimed in claim 10, wherein the CQI and/or PCI reports are according to a first type for reporting CQI and PCI corresponding to a preferred number of streams and/or a second type for reporting about a single stream CQIs, and wherein the received reports of the first and/or second type is according to a ratio between the first and second type, which ratio is comprised in the reporting instruction and is based on the determined MIMO mode that the mode instruction instructed the user equipment to use.

12. The method as claimed in claim 11, wherein the mode instruction instructs the user equipment use a MIMO mode comprising single stream restriction and the ratio comprised in the reporting instruction indicates reporting only according to the second type, or at least according to a maximal amount that is available according to values allocated for the ratio.

13. A user equipment for handling of stream restriction in a cellular communications system supporting four branch Multiple Input Multiple Output (MIMO), the cellular communications system comprising a base station serving a cell of the cellular communications system, and a controlling node controlling the base station, wherein the user equipment comprises:
a supporting circuitry configured to support one or more MIMO modes of MIMO operation of the user equipment, which one or more MIMO modes are associated with four branch MIMO and one or more of a single stream restriction, a dual stream restriction and no restriction, wherein the one or more MIMO modes comprise a MIMO mode, which is a single MIMO mode associated with the single stream restriction, the dual stream restriction, and the no restriction,
a signaling port configured to signal at least one of said supported MIMO modes to the controlling node via the base station, wherein when the MIMO mode, which is the single MIMO mode associated with the single stream restriction, the dual stream restriction, and the no restriction, is signaled, the signaling port is further configured to signal separate signaling associated with number of supported streams, and a receiving port configured to receive from the controlling node via the base station, in response to said signaling, a mode instruction instructing the user equipment to use one of said at least one MIMO mode signaled to the controlling node.

14. The user equipment as claimed in claim 13, wherein the one or more MIMO modes further comprise separate MIMO modes, each associated with the respective single stream restriction, dual stream restriction and no restriction.

15. The user equipment as claimed in claim 13, wherein said at least one MIMO mode signaled to the controlling node comprises the single stream restriction and/or the dual stream restriction.

16. The user equipment as claimed in claim 13, wherein the receiving port is further configured to receive from the controlling node via the base station, a reporting instruction instructing the user equipment how to report a Channel Quality Indicator (CQI), and/or Physical Channel Indicator (PCI), via an uplink feedback channel, said reporting instruction being based on said at least one MIMO mode signaled to the controlling node, and the user equipment further comprises:

a sending port configured to send to the controlling node via the base station and the uplink feedback channel, CQI and/or PCI reports based on said reporting instruction.

17. The user equipment as claimed in claim 16, wherein the CQI and/or PCI reports are according to a first type for reporting CQI and PCI corresponding to a preferred number of streams and/or a second type for reporting about a single stream CQIs, and wherein the sending port is configured to send the reports of the first and/or second type according to a ratio between the first and second type, which ratio is comprised in the reporting instruction and is based on a MIMO mode that the mode instruction instructed the user equipment to use.

18. The user equipment as claimed in claim 17, wherein the mode instruction instructs the user equipment to use a MIMO mode comprising single stream restriction and the ratio comprised in the reporting instruction indicates reporting only according to the second type, or at least according to a maximal amount that is available according to values allocated for the ratio.

19. A controlling node for handling of stream restriction of a user equipment in a cellular communications system supporting four branch Multiple Input Multiple Output (MIMO), the cellular communications system comprising a base station serving a cell of the cellular communications system and being controlled by the controlling node, wherein the controlling node comprises:

a receiving port configured to receive from the user equipment via the base station, signaling of at least one of one or more MIMO modes supported by the user equipment, which one or more MIMO modes are associated with four branch MIMO and one or more of a single stream restriction, a dual stream restriction and no restriction, wherein the one or more MIMO modes comprise a MIMO mode, which is a single MIMO mode associated with the single stream restriction, the dual stream restriction, and the no restriction, wherein when the MIMO mode, which is the single MIMO mode associated with the single stream restriction, the dual stream restriction, and the no restriction, is signaled, the signaling further comprises separate signaling associated with number of supported streams, a determining circuitry configured to determine, based on said received signaling, one of said at least one MIMO mode to be used by the user equipment, and a sending port configured to send to the user equipment via the base station, a mode instruction instructing the user equipment to use the determined MIMO mode.

20. The controlling node as claimed in claim 19, wherein the one or more MIMO modes further comprise separate MIMO modes, each associated with the respective single stream restriction, dual stream restriction and no restriction.

21. The controlling node as claimed in claim 19, wherein said at least one MIMO mode signaled to the controlling node comprises the single stream restriction and/or the dual stream restriction.

22. The controlling node as claimed in claim 19, wherein the sending port is further configured to send to the user equipment via the base station, a reporting instruction instructing the user equipment how to report a Channel Quality Indicator (CQI), and/or Physical Channel Indicator (PCI), via an uplink feedback channel, said reporting instruction being based on the determined MIMO mode, and wherein the receiving port is further configured to receive from the user equipment via the base station and the uplink feedback channel, CQI and PCI reports based on said reporting instruction.

23. The controlling node as claimed in claim 22, wherein the CQI and/or PCI reports are according to a first type for reporting CQI and PCI corresponding to a preferred number of streams and/or a second type for reporting about a single stream CQIs, and wherein the received reports of the first and/or second type is according to a ratio between the first and second type, which ratio is comprised in the reporting instruction and is based on the determined MIMO mode that the mode instruction instructed the user equipment to use.

24. The controlling node as claimed in claim 23, wherein the mode instruction instructs the user equipment to use a MIMO mode comprising single stream restriction and the ratio comprised in the reporting instruction indicates reporting only according to the second type, or at least according to a maximal amount that is available according to values allocated for the ratio.

\* \* \* \* \*